Patented Sept. 9, 1924.

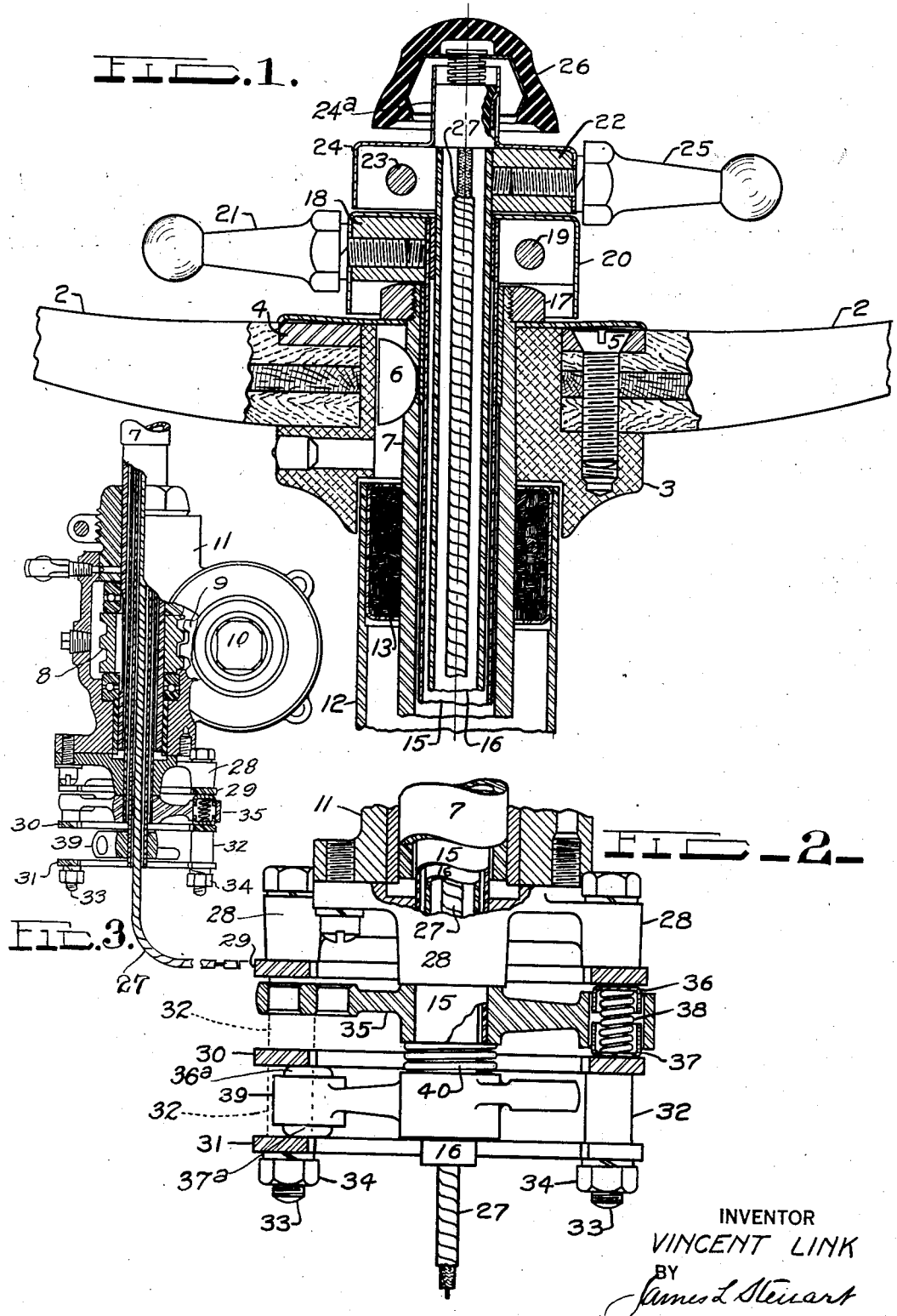

1,507,923

UNITED STATES PATENT OFFICE.

VINCENT LINK, OF DETROIT, MICHIGAN, ASSIGNOR TO THE STUDEBAKER CORPORATION, OF SOUTH BEND, INDIANA, A CORPORATION OF NEW JERSEY.

MOTOR-CONTROLLING MECHANISM.

Application filed May 3, 1923. Serial No. 636,304.

*To all whom it may concern:*

Be it known that I, VINCENT LINK, a citizen of the United States, and resident of Detroit, in the county of Wayne and State of Michigan, have invented certain new and useful Improvements Pertaining to Motor-Controlling Mechanism, of which the following is a specification.

This invention has reference to control mechanisms for motors and particularly relates to a novel arrangement of the several principal elements of the control system of an automobile whereby a compact, sightly, effective and economical organization is produced for controlling the operation of the engine and steering the car.

It has been the practice to hold the controlling levers for spark and throttle, in an automobile engine, in adjusted position by frictional engagement with a quadrant located above the steering wheel. To position and hold the quadrant, it is necessary to extend a tube from the lower part of the steering gear case up to a point above the steering wheel. Other forms of frictional devices are also used; but, in all instances they are positioned above the steering wheel, are bulky and produce an unsightly protuberance above the steering wheel and necessitate the provision of a tube running the full length of the steering column.

I avoid the objectionable features of the usual forms of construction by combining with the steering column of an automobile a new controlling system for the spark and throttle of the engine, and, in so doing, I provide a simple, attractive, strong and durable means having many advantages over old forms, among the objects of which the following may be noted: to do away with the frictional devices at the upper end of the steering column and above the steering wheel and thus eliminate the tube for holding the same; to locate the frictional means at the lower end of the steering column and below the dash of the car where they will be out of sight and may be, consequently, economically produced, since finishing and polishing are unnecessary; to provide a construction such that small control levers of attractive appearance may be used at the upper end of the steering column and above the steering wheel and compact frictional means may be located at the lower end of the steering column and fastened to the lower face of the steering gear case; to provide a novel form of frictional devices embodied in the frictional means arranged concentrically with the steering column; and to so combine the spark and throttle controlling means with the steering column as to enable control to be effected rapidly and with facility.

In order that my invention may be clearly understood, I have provided drawings wherein:

Fig. 1 is a sectional elevation of the upper end of the steering column, the wheel being broken off at opposite sides.

Fig. 2 is a view of the lower end of the steering column, parts being broken away to show details of construction.

Fig. 3 is a sectional view of the lower end of the steering column showing further details of construction.

Referring to the drawings, the spokes 2 of the steering wheel are at a right-angle to each other and are combined centrally of the rim and bored to receive a hub 3 secured to the spokes by a ring 4 and screws 5 passing through the latter, the spokes and into the hub, see Figure 1, a finishing plate being applied to cover the ring, hub and screws, as usual. The hub 3 is keyed at 6 to the hollow steering post 7, the lower end of which, Figure 3, is provided with a worm 8 meshing with worm-wheel 9 secured to the arm 10 of the steering gear which members, together with suitable anti-frictional devices, adjusting means, and oiling devices, are supported in the inclosing casing 11, Figure 1. Surrounding the steering post 7 is the housing 12, the upper end of which extends into the hub 3 and is provided with a bearing 13 for the post 7, Figure 1 and a second bearing for said post at its lower end, not shown, said housing being held against rotation by being fixed to the dash and thus being able to aid in the support of the steering gear.

Two concentric tubes 15 and 16 are placed within and concentrically of the post 7 and extend the full length of the steering column. The upper end of the tube 15 projects far enough above the nut 17, at the top of the post 7, to allow the ring 18 to be clamped thereon by screw 19, a cover 20 being placed over the ring and an actuating arm 21 being threaded into the ring through a hole in the cover. The tube 16 projects far enough beyond the end of the tube 15 to allow the ring 22 to be clamped thereon by screw 23, a cover 24 being placed over the ring and an actuating arm 25 being threaded into the ring 22 through a hole in the cover 24. The ring 24 has a central tubular portion 24ª extending above the end of tube 16 which acts as a housing for the push-button structure 26, an insulated wire 27 extending from which connects with a suitable horn.

Bracket 28 is secured to the lower end of casing 11, and has fastened to it three parallel, arcuate members 29, 30 and 31. Member 29 is fastened, at its opposite ends, directly to the bracket, spacers 32 separating the member from member 30, and similar spacers separating the latter from member 31. Two bolts 33 pass through the bracket 28 and the opposite ends of each of the members 29, 30 and 31 and also through the spacers 32, and with nuts 34 fasten the several elements to the bracket 28. The members 29, 30 and 31 are arranged in the same inclined plane parallel with the axis of the post 7 and tubes 15 and 16, and are also concentric with the latter. The tube 15 extends far enough through the bracket 28 for the lever 35 to be clamped thereon just below the member 29, said lever having a central split hub for the purpose. Lever 35 has one end enlarged and bored and extended between the members 29 and 30, the opposite end of the lever extending beyond the scope of the members 29 and 30 and being formed to adapt it for connection with either the spark or throttle of the engine. In the bored end of lever 35, two cup-shaped, oppositely disposed, frictional members 36, 37 are arranged, an expansion spring 38 forcing them outwardly into engagement with the opposed surfaces of the members 29 and 30. The friction set up between the closed ends of the cups and the members 29, 30, is ample to hold the lever 35 in any position to which it may be shifted. The tube 16 extends through tube 15 far enough for the lever 39 to be clamped thereon just below the member 30, said lever having a central split hub for the purpose. Lever 39 has one end enlarged and bored and extended between members 30 and 31, the opposite end of the lever extending beyond the scope of the members 30 and 31, and being formed to adapt it for connection with either the spark or throttle of the engine. In the bored end of lever 39 two cup-shaped, oppositely disposed, frictional members 36ª and 37ª are arranged, an expansion spring between the two forcing them apart for frictional engagement with the members 30, 31. An expansion spring 40 encircles tube 16 between the hubs of levers 35, 39 and operates to prevent rattling due to jars while the car is in motion.

It will now be seen that the arrangement is such that any movement given the arms 21, 25 will be imparted to the levers 35, 39, respectively, and that either arm and its connected lever may be coupled to the spark or throttle mechanism as may be found most convenient. Adjustments of the levers are maintained by the frictional means 29, 30, 31 and 36, 37, 36ª and 37ª. By arranging frictional means in the operating levers a simple, compact, strong durable and effective construction is provided. Moreover, the structure is cheapened considerably, as compared with usual forms of construction, since the usual supporting tube is eliminated and finishing and polishing are unnecessary since the frictional members are out of sight. Also the arms 21, 25 and the signal-button are the only devices on or above the steering wheel, thus providing simplicity of structure, neat and attractive appearance, and avoiding all possibility of confusion or accident.

In the drawings I have shown a form or structure which is illustrative of my invention; but, I desire it understood that my invention, in its broad aspect, is not confined or restricted to the details shown. A controlling mechanism, for the spark and throttle of an engine, constructed so as to have its principal parts out of sight and its manipulating members conveniently arranged at the steering wheel, is believed to be broadly new; and these parts, when combined with the steering column and signaling means, produce a novel and useful arrangement forming part of my invention.

In the foregoing description and in the claims, I have differentiated the hand operated devices 21 and 25, at the top of the steering column, from the frictional devices 35 and 39, at the bottom of the steering column, by designating the former "manipulating" means and the latter "controlling" means.

Having thus described my invention, what I claim and desire to secure by Letters Patent is:

1. Controlling mechanism for the spark and throttle of an engine, comprising telescoping supporting members; manipulating means connected to said members at one end; a gear casing near the other end of said members; a bracket at the other end of said members below the casing; controlling means for the spark and throttle carried by the members below the bracket; and interacting parts mounted upon the bracket and controlling means for holding the latter in adjusted position.

2. Controlling mechanism for the spark and throttle of an engine comprising telescoping supporting members; manipulating means connected to said members at one end; a bracket at the other end of said members;

friction members supported by said bracket; and friction members connected to said telescoping members for cooperation with the friction members of the bracket.

3. Controlling mechanism for the spark and throttle of an engine, comprising telescoping members; manipulating means connected to said members at one end; a plurality of levers at the opposite end of said members, each lever having friction-producing means; and stationary friction-producing means for cooperation with the friction means of the levers.

4. Controlling mechanism for the spark and throttle of an engine, comprising telescoping members; manipulating means connected to said members at one end; a plurality of levers at the opposite end of said members, each of said levers having friction-producing means; and a bracket in fixed relation to the levers having a plurality of friction-producing members mounted thereon in operative relation to the levers.

5. In combination with a steering column having a wheel thereon at one end and a gear casing thereon at the other end, engine control mechanism mounted on the column having manipulating means adjacent the wheel and frictional holding means adjacent the casing.

6. In combination with a steering column having a wheel thereon at one end and a gear casing thereon at the other end, engine control mechanism mounted on the column having manipulating means adjacent the wheel and frictional holding means adjacent the casing, comprising a bracket having a plurality of arcuate-plates, and a plurality of levers cooperating with said plates.

7. In combination with a steering column having a wheel thereon at one end and a gear casing thereon at the other end, engine control mechanism mounted on the column having manipulating means adjacent the wheel and frictional holding means adjacent the casing, comprising a bracket mounted on the casing and provided with a plurality of arcuate-plates, and a plurality of levers mounted on the column cooperating with said plates.

8. In combination with a steering column having a wheel thereon at one end and a gear casing thereon at the other end, engine control mechanism mounted on the column having manipulating means adjacent the wheel and frictional holding means adjacent the casing, comprising a bracket having a plurality of parallel arcuate-plates, and a plurality of levers each having an end cooperating with two of said plates.

9. In combination with a steering column having a wheel thereon at one end and a gear casing thereon at the other end, engine control mechanism mounted on the column having manipulating means adjacent the wheel and frictional holding means adjacent the casing, comprising a bracket having a plurality of arcuate-plates, and a plurality of levers each having friction producing means cooperating with said plates.

10. In combination with a steering column having a wheel at one end and a gear casing at the other, engine controlling mechanism comprising tubes mounted on the column, each tube having a manipulating handle at one end and friction-producing means at the other end adjacent the casing, said casing carrying a bracket provided with frictional means for cooperation with the frictional means of the tubes.

11. In combination with a tubular steering column, engine control means comprising telescoping tubes mounted on said column; each of said tubes having a manipulating handle at one end and a frictional device at the other end; and means carried by the column for cooperation with said frictional devices for controlling the position of the latter.

12. In combination with a tubular steering column, having a gear casing mounted thereon, engine control means comprising telescoping tubes mounted on said column, each of said tubes having a manipulating handle and a frictional device; and means carried by said casing for cooperation with said frictional devices for controlling the position of the latter.

13. In combination with a steering column having a gear casing mounted thereon at one end, engine controlling means comprising telescoping tubes mounted on said column; each of said tubes having a manipulating handle thereon at one end, and a friction device thereon at the other end; a bracket mounted on said casing having friction-producing means with which the friction devices cooperate; the said telescoping tubes extending through both the casing and bracket.

14. In combination with a steering column having a gear casing mounted thereon at one end and a wheel at the other end, a housing in which the column is journaled; engine controlling means mounted on said column within the casing comprising a pair of telescoping tubes, each having a manipulating handle above the wheel, and each having a friction-producing device below the casing; and friction-producing means mounted on the casing for interaction with the friction devices.

15. In combination with a steering column having a gear casing mounted thereon at one end and a wheel at the other end, a housing in which the column is journaled; engine controlling means mounted on said column within the casing comprising a pair of telescoping tubes, each having a manipulating handle above the wheel, and each having a lever mounted thereon below the casing, said levers carrying friction devices; and a plurality of friction plates carried by said casing in cooperative relation to said friction devices.

16. In combination with a steering column having a gear casing mounted thereon at one end and a wheel at the other end, a housing in which the column is journaled; engine controlling means mounted on said column within the casing comprising a pair of telescoping tubes, each having a manipulating handle above the wheel, and each having a friction-producing device below the casing; a bracket mounted on said casing having a plurality of parallel friction plates; the devices and plates being alternately arranged so that said devices will cooperate with a pair of plates.

17. Friction-producing means for motor control mechanism having, in combination, a steering column; a supporting bracket at the lower end of said column; a plurality of parallel arcuate-plates fixed on said bracket; a plurality of levers rotatably mounted between said plates; and frictional means carried by the levers and engaging said plates.

18. Friction-producing means for motor control mechanism having, in combination, a supporting bracket, a plurality of parallel plates mounted thereon, a plurality of levers rotatably mounted between said plates, said levers carrying yieldingly mounted frictional cups operating between and engaging said plates.

19. In combination with the steering column of a motor vehicle, motor control mechanism comprising a supporting bracket at one end of the column; a plurality of parallel arcuate plates fixed to the bracket; a plurality of levers rotatably mounted between the plates; frictional means carried by the levers and engaging the plates; and means for actuating the levers.

Signed by me at Detroit, Michigan, U. S. A., this 14th day of April, 1923.

VINCENT LINK.

Witnesses:
   HODGSON S. PIERCE,
   ELMER L. McINTYRE.